(12) United States Patent
Knight

(10) Patent No.: US 8,566,740 B2
(45) Date of Patent: Oct. 22, 2013

(54) INTERACTIVE DATA FORECASTING FEATURES FOR A GRAPHICAL USER INTERFACE

(75) Inventor: David Knight, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 283 days.

(21) Appl. No.: 13/079,981

(22) Filed: Apr. 5, 2011

(65) Prior Publication Data

US 2012/0144340 A1 Jun. 7, 2012

Related U.S. Application Data

(60) Provisional application No. 61/419,789, filed on Dec. 3, 2010.

(51) Int. Cl.
G06F 3/14 (2006.01)

(52) U.S. Cl.
USPC .............. 715/781; 715/753; 715/503; 345/30

(58) Field of Classification Search
USPC ............ 715/200–277, 700–867; 345/30–111;
700/701–866; 709/201–229;
705/50–79
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |

(Continued)

Primary Examiner — Ruay Ho
(74) Attorney, Agent, or Firm — Ingrassia Fisher & Lorenz, P.C.

(57) ABSTRACT

A computer system and related display techniques are presented here. The system generates and provides a graphical user interface (GUI) control element to enable user adjustment of sales forecast data, and provides a hover box associated with the GUI control element, the hover box graphically indicating adjustment status information for the sales forecast data. The system also provides a forecast table panel in the GUI. In response to receiving a request corresponding to selected forecast data included in the forecast table panel, the system generates an opportunities list panel in the GUI. The opportunities list panel includes a listing of individual opportunities and related status corresponding to the selected forecast data.

38 Claims, 12 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0061698 A1* | 3/2007 | Megiddo et al. ............ 715/503 |
| 2009/0164915 A1* | 6/2009 | Gasn et al. ................. 715/753 |

\* cited by examiner

| Home | Leads | Accounts | Contacts | Opportunities | Forecasts | Reports | Dashboards | Documents | Products | + |
|------|-------|----------|----------|---------------|-----------|---------|------------|-----------|----------|---|

Gordon Johnson Forecast

Quota View: With Currency    Currency Format: Whole Units

| | Quota | Closed | Commit | Best Case | Pipeline |
|---|---|---|---|---|---|
| Total: November 2010 - April 2011 *Change Range* | $2,147,600 | $266,449 | $300,768 | $370,781 | $756,507 |
| [−] November 2010   2 days remaining | $420,000 | $266,449 | $4,146 | $0 | $5,011 |
|     Renee Moreau | $73,200 | $40,386 | $0 | $0 | $0 |
|     Jimmy Kim | $49,600 | $44,188 | $4,146 | $0 | $0 |
|     Robert Ward | $69,000 | $42,668 | $0 | $0 | $2,000 |
|     Kelly Brooks | $48,000 | $59,361 | $0 | $0 | $1,195 |
|     Susan Grafton | $88,800 | $79,846 | $0 | $0 | $1,816 |
| [+] December 2010 | $397,600 | $0 | $79,126 | $46,175 | $186,195 |
| [+] January 2011 | $420,000 | $0 | $54,203 | $88,391 | $151,003 |
| [+] February 2011 | $254,800 | $0 | $73,783 | $76,021 | $130,349 |
| [+] March 2011 | $238,000 | $0 | $47,131 | $97,134 | $134,592 |
| [+] April 2011 | $417,200 | $0 | $42,379 | $63,060 | $149,357 |

Gordon Johnson Team • November 2010 • All categories • $275,606    [+ Show Details]

FIG. 4

| Home | Leads | Accounts | Contacts | Opportunities | Forecasts | Reports | Dashboards | Documents | Products | + |
|------|-------|----------|----------|---------------|-----------|---------|------------|-----------|----------|---|

Gordon Johnson Forecast

Quota View: With Currency    Currency Format: Whole Units

| | Quota | Closed | Commit | Best Case | Pipeline |
|---|---|---|---|---|---|
| Total: November 2010 - April 2011 Change Range | $2,147,600 | $266,449 | $69,206 * | $370,781 | $756,507 |
| [−] November 2010  2 days remaining | $420,000 | $266,449 | $7,746 * | $0 | $5,011 |
| Renee Moreau | $73,200 | $40,386 | $0 | $0 | $0 |
| Jimmy Kim | $49,600 | $44,188 | $4,146 | $0 | $0 |
| Robert Ward | $69,000 | $42,668 | $3,600 * | $0 | $2,000 |
| Kelly Brooks | $48,000 | $59,361 | $0 | $0 | $1,195 |
| Susan Grafton | $88,800 | $79,846 | $0 | $0 | $1,816 |
| [+] December 2010 | $397,600 | $0 | $67,410 * | $46,175 | $186,195 |
| [+] January 2011 | $420,000 | $0 | $46,006 * | $88,391 | $151,003 |
| [+] February 2011 | $254,800 | $0 | $73,783 | $76,021 | $130,349 |
| [+] March 2011 | $238,000 | $0 | $47,131 | $97,134 | $134,592 |
| [+] April 2011 | $417,200 | $0 | $42,379 | $63,060 | $149,357 |

Gordon Johnson Team • November 2010 • All categories • $279,206 (Adjusted)    + Show Details

FIG. 5

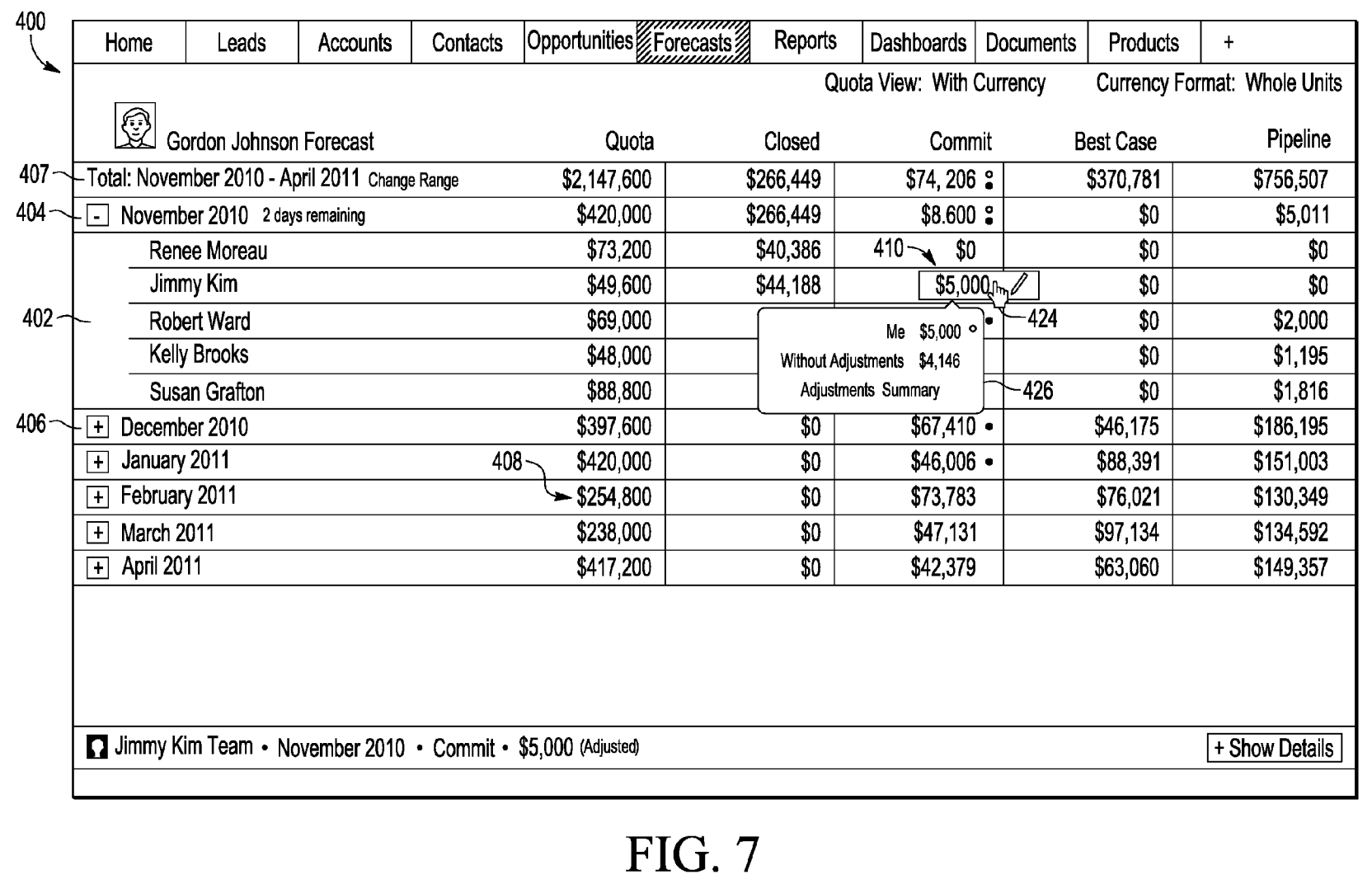

| Home | Leads | Accounts | Contacts | Opportunities | Forecasts | Reports | Dashboards | Documents | Products | + |
|---|---|---|---|---|---|---|---|---|---|---|

Gordon Johnson Forecast

Quota View: With Currency     Currency Format: Whole Units

| | Quota | Closed | Commit | Best Case | Pipeline |
|---|---|---|---|---|---|
| Total: November 2010 - April 2011 Change Range | $2,147,600 | $266,449 | $74,206 | $370,781 | $756,507 |
| November 2010  2 days remaining | $420,000 | $266,449 | $8,600 | $0 | $5,011 |
|    Renee Moreau | $73,200 | $40,386 | $0 | $0 | $0 |
|    Jimmy Kim | $49,600 | $44,188 | $0 | $0 | $0 |
|    Robert Ward | $69,000 | | Me  $5,000 | $0 | $2,000 |
|    Kelly Brooks | $48,000 | Without Adjustments  $4,146 | | $0 | $1,195 |
|    Susan Grafton | $88,800 | Adjustments Summary | | $0 | $1,816 |
| December 2010 | $397,600 | $0 | $67,410 | $46,175 | $186,195 |
| January 2011 | $420,000 | $0 | $46,006 | $88,391 | $151,003 |
| February 2011 | $254,800 | $0 | $73,783 | $76,021 | $130,349 |
| March 2011 | $238,000 | $0 | $47,131 | $97,134 | $134,592 |
| April 2011 | $417,200 | $0 | $42,379 | $63,060 | $149,357 |

Jimmy Kim Team • November 2010 • Commit • $5,000 (Adjusted)     + Show Details

FIG. 7

| ta | Closed | Commit | |
|---|---|---|---|
| 00 | $172,773 | $104,044 ° | ← 442 |
| 00 | $172,773 | $61,113 • | ← 444 |
| 00 | $61,463 | $10,141 | |
| 00 | $20,781 | $24,232 | ← 440 |
| 00 | $18,187 | $4,000 ° | |
| 00 | $14,316 | $11,386 | |
| 00 | Me | $4,000 ° | ← 436 |
| 00 | Robert Ward and Subordinates | $3,600 • | ← 438 |
| 00 | Without Adjustments | $3,081 | |
|    | ADJUSTMENTS SUMMARY | | ← 434 |

FIG. 9

| Home | Leads | Accounts | Contacts | Opportunities | Forecasts | Reports | Dashboards | Documents | Products | + |
|------|-------|----------|----------|---------------|-----------|---------|------------|-----------|----------|---|

Gordon Johnson Forecast

Quota View: With Currency     Currency Format: Whole Units

Total: November 2010 - April 2011  Change Range

| | Quota | Closed | Commit | Best Case | Pipeline |
|---|---|---|---|---|---|
| | $2,147,600 | $266,449 | $300,768 | $370,781 | $756,507 |
| [+] November 2010  2 days remaining | $420,000 | $266,449 | $4,146 | $0 | $5,011 |
| [−] December 2010 | $397,600 | $0 | $79,126 | $46,175 | $186,195 |
|    Renee Moreau | $69,000 | $0 | $8,093 | $7,206 | $52,538 |
|    Jimmy Kim | $42,500 | $0 | $16,023 | $13,974 | $29,258 |
|    Robert Ward | $56,000 | $0 | $19,739 | $4,089 | $42,547 |
|    Kelly Brooks | $68,000 | | $14,737 | $9,956 | $31,531 |

− Hide Details

Gordon Johnson Team • November 2010 • All categories • $275,606

| Opportunity Name | Account Name | Amount | Close Date | Stage | Probability (%) | Category | Owner |
|---|---|---|---|---|---|---|---|
| 320 Consumer Pkg | Northwestern Electrics | $7,937 | 11/21/2010 | Closed Won | 100% | Closed | Michelle Rodriguez |
| 20 Phone + Mobile | Electronics Supplier USA | $7,667 | 11/11/2010 | Closed Won | 100% | Closed | Alan carter |
| Cable Upgrade Pkg | Green Recycle Center | $7,448 | 11/17/2010 | Closed Won | 100% | Closed | James Smith |
| Add-on Service | Pacific Computers | $7,354 | 11/19/2010 | Closed Won | 100% | Closed | Madison Rigsby |
| 150 Telecom Equipment | General Corporation | $7,238 | 11/15/2010 | Closed Won | 100% | Closed | Peter Turner |
| 350 Conference Equip | Acme | $7,237 | 11/19/2010 | Closed Won | 100% | Closed | Bobby McNabb |

1-25 of 65     First  <Previous  Next>  Last     Page 1 of 3

FIG. 10

| Home | Leads | Accounts | Contacts | Opportunities | ////Forecasts//// | Reports | Dashboards | Documents | Products | + |

Gordon Johnson Forecast

Quota View: With Currency   Currency Format: Whole Units

| | Quota | Closed | Commit | Best Case | Pipeline |
|---|---|---|---|---|---|
| Total: November 2010 - April 2011 Change Range | $2,147,600 | $266,449 | $300,768 | $370,781 | $756,507 |
| [+] November 2010  2 days remaining | $420,000 | $266,449 | $4,146 | $0 | $5,011 |
| [−] December 2010 | $397,600 | $0 | $79,126 | $46,175 | $186,195 |
| Renee Moreau | $69,000 | $0 | $8,093 | $7,206 | $52,538 |
| Jimmy Kim  View Forecast | $42,500 | $0 | $16,023 | $13,974 | $29,258 |
| Robert Ward | $56,000 | $0 | $19,739 | $4,089 | $42,547 |
| Kelly Brooks | $68,000 | $0 | $14,737 | $9,956 | $31,531 |
| Susan Grafton | $67,000 | $0 | $20,534 | $10,950 | $30,321 |

Jimmy Kim Team • December 2010 • Commit • $16,023                                      − Hide Details

| Opportunity Name | Account Name | Amount | Close Date | Stage | Probability (%) | Category | Owner |
|---|---|---|---|---|---|---|---|
| Cable Upgrade Pkg | Asia Circuits | $7,807 | 12/06/2010 | Proposal/Price Quote | 70% | Commit | Sally Williamson |
| 860 Conference Equip | Pacific Computers | $4,492 | 12/31/2010 | Negotiation/Review | 70% | Commit | David Brown |
| 310 Consumer Pkg | Green Recycle Center | $3,724 | 12/23/2010 | Negotiation/Review | 70% | Commit | Sally Williamson |

1-3 of 3                           First  <Previous  Next>  Last                           Page 1 of 1

FIG. 11

| Home | Leads | Accounts | Contacts | Opportunities | Forecasts | Reports | Dashboards | Documents | Products | + |
|---|---|---|---|---|---|---|---|---|---|---|

Jimmy Kim Forecast

Quota View: With Currency    Currency Format: Whole Units

| | Quota | Closed | Commit | Best Case | Pipeline |
|---|---|---|---|---|---|
| Total: November 2010 - April 2011 Change Range | $345,000 | $44,188 | $70,664 | $94,049 | $146,618 |
| [+] November 2010  2 days remaining | $49,500 | $44,188 | $4,146 | $0 | $0 |
| [−] December 2010 | $42,500 | $0 | $16,023 | $13,974 | $29,256 |
|    Carlos Gonzales | $9,000 | $0 | $0 | $6,229 | $8,920 |
|    David Brown — 468 | $12,200 | $0 | $4,492 | $0 | $6,794 |
|    Sally Williamson  View Forecast | $9,700 | $0 | $11,531 | $4,746 | $3,060 |
|    Harry Powell | $9,000 | $0 | $0 | $2,999 | $10,484 |
| [+] January 2011 | $62,000 | 454 | $1,357 | $5,460 | $44,464 |

Jimmy Kim Team • December 2010 • All categories • $59,255        − Hide Details

| Opportunity Name | Account Name | Amount | Close Date | Stage | Probability (%) | Category | Owner |
|---|---|---|---|---|---|---|---|
| Cable Upgrade Pkg | Asia Circuits | $7,807 | 12/6/2010 | Proposal/Price Quote | 60% | Commit | Sally Williamson |
| 770 Mixed Equipment | ABC Incorporated | $6,229 | 12/3/2010 | Id Decision makers | 40% | Best Case | Carlos Gonzalez |
| 350 Headsets | General Corporation | $5,435 | 12/12/2010 | Open | 10% | Pipeline | Carlos Gonzalez |
| 640 Phone + Mobile | Asia Circuits | $5,360 | 12/5/2010 | Open | 10% | Pipeline | Henry Powell |
| 730 Telecom Equipment | ABC Incorporated | $5,124 | 12/17/2010 | Prospecting | 10% | Pipeline | Henry Powell |

1-14 of 14                                      First <Previous Next> Last                              Page 1 of 1

FIG. 12

INTERACTIVE DATA FORECASTING FEATURES FOR A GRAPHICAL USER INTERFACE

CROSS-REFERENCE TO RELATED APPLICATION(S)

This application claims the benefit of U.S. provisional patent application Ser. No. 61/419,789, filed Dec. 3, 2010.

TECHNICAL FIELD

Embodiments of the subject matter described herein relate generally to data processing systems and techniques, such as systems and processes that use a common network-based platform to support applications executing on behalf of multiple tenants. More particularly, embodiments of the subject matter relate to the presentation of forecasting data in connection with a graphical user interface of an application, such as a customer relationship management application.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system wherein a single hardware and software platform simultaneously supports multiple user groups (also referred to as "organizations" or "tenants") from a common data store. The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

A customer relationship management (CRM) application may be deployed using a multi-tenant architecture. A CRM application can be used to track sales activity, the progression of potential sales deals, sales team quotas, and the like. Moreover, a CRM application may support various forecasting features that enable sales managers and individuals to generate forecast reports for review by others. It is desirable to have an efficient and user friendly interface that facilitates quick and easy access to forecast reports and forecast data, organized as needed.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 4-12 illustrate various GUI screen displays presented in connection with the use of a sales forecasting application.

DETAILED DESCRIPTION

The exemplary embodiments presented here relate to various techniques for processing and presenting sales forecast data in the context of the use and manipulation of GUIs, web pages, and interactive displays associated with a computer-implemented system or application, such as a software-based system, a database system, a multi-tenant environment, or the like. The described subject matter could be implemented in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

Figure 1:
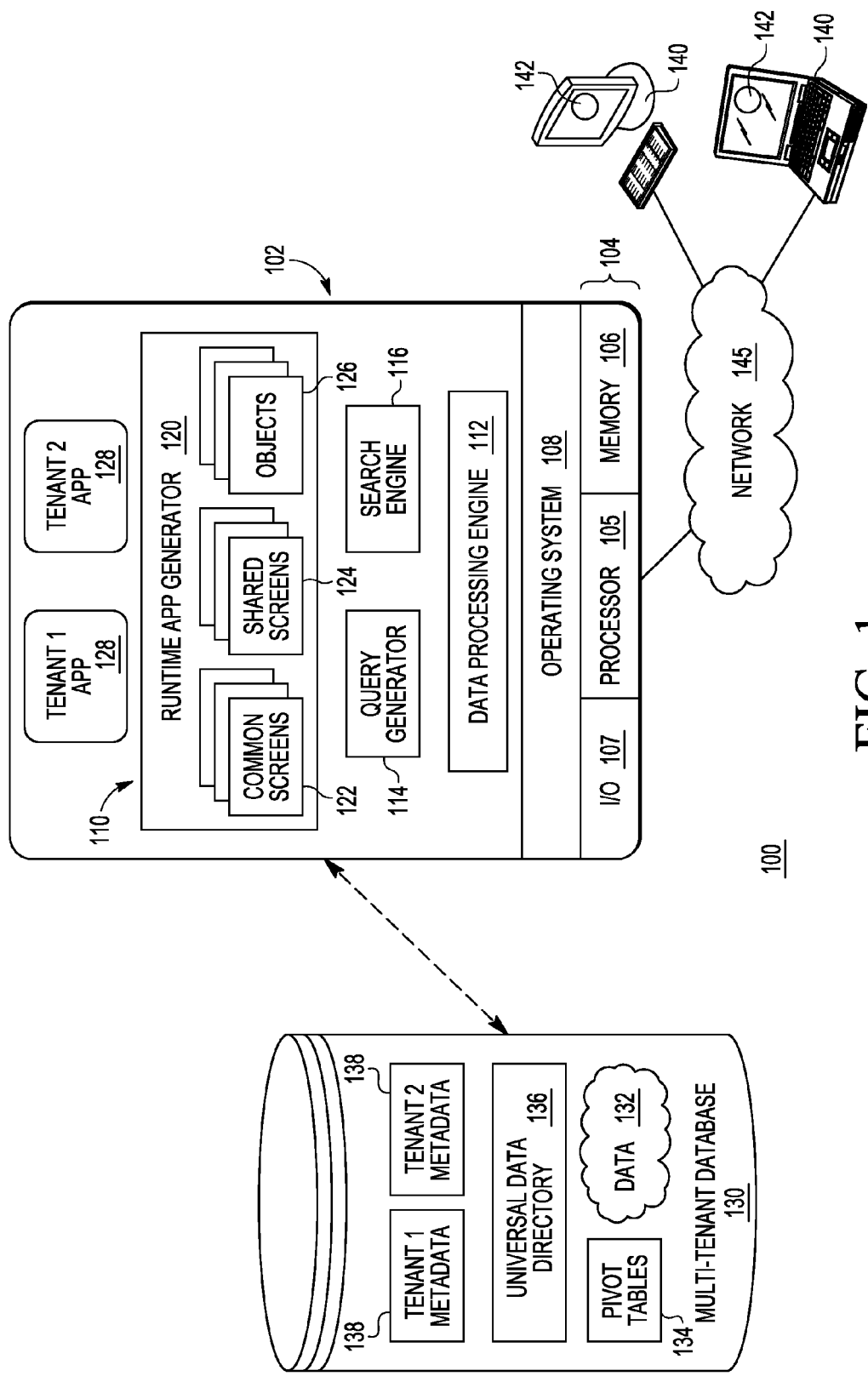
FIG. 1 is a block diagram of an exemplary multi-tenant data processing system.

Turning now to FIG. 1, an exemplary multi-tenant application system 100 suitably includes a server 102 that dynamically creates virtual applications 128 based upon data 132 from a common database 130 that is shared between multiple tenants. Data and services generated by the virtual applications 128 are provided via a network 145 to any number of user devices 140, as desired. Each virtual application 128 is suitably generated at run-time using a common application platform 110 that securely provides access to the data 132 in the database 130 for each of the various tenants subscribing to the system 100. In accordance with one non-limiting example, the system 100 may be implemented in the form of a multi-tenant CRM system that can support any number of authenticated users of multiple tenants.

A "tenant" or an "organization" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The server 102 typically includes or cooperates with some type of computer-readable media, where a tangible computer-readable medium has computer-executable instructions stored thereon. The computer-executable instructions, when read and executed by the server 102, cause the server 102 to perform certain tasks, operations, functions, and processes described in more detail herein. In this regard, the memory 106 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the user devices 140. The virtual applications 128 are typically generated at run-time in response to queries received from the user devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its user device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc. In certain embodiments, the data processing engine 112 and the processor 105 cooperate in an appropriate manner to perform and manage the various user authentication, access token processing, data access granting, and other techniques, processes, and methods described in more detail below with reference to FIG. 2 and FIG. 3.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128. As described in greater detail below in the context of FIGS. 2-12, in exemplary embodiments, the application platform 110, the data processing engine 112, the query generator 114, and the processor 105 cooperate in an appropriate manner to process data associated with a virtual application 128, generate and provide suitable GUIs (such as web pages) for presenting the data on client devices 140, and perform additional techniques, processes, and methods to support the features and functions related to the management and presentation of forecast data in the multi-tenant application system 100.

The data and services provided by the server 102 can be retrieved using any sort of personal computer, mobile telephone, tablet or other network-enabled user device 140 on the network 145. Typically, the user operates a conventional browser or other client program 142 to contact the server 102 via the network 145 using, for example, the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the user device 140; other embodiments may simply provide dynamic web or other content that can be presented and viewed by the user, as desired.

Figure 2:
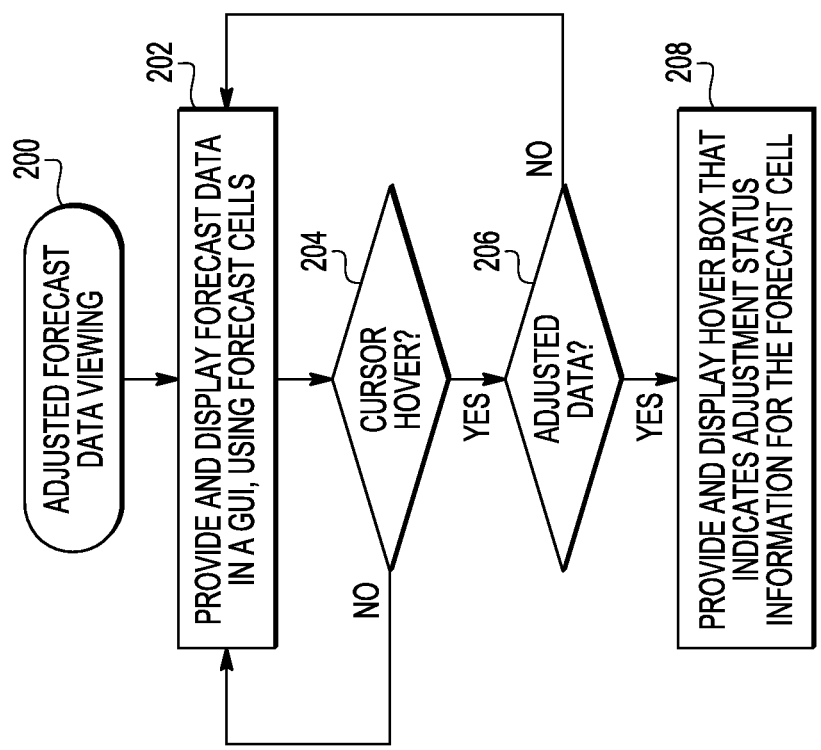
FIG. 2 is a flow chart that illustrates an exemplary embodiment of a process for presenting adjusted forecast data in a graphical user interface (GUI)
Figure 3:
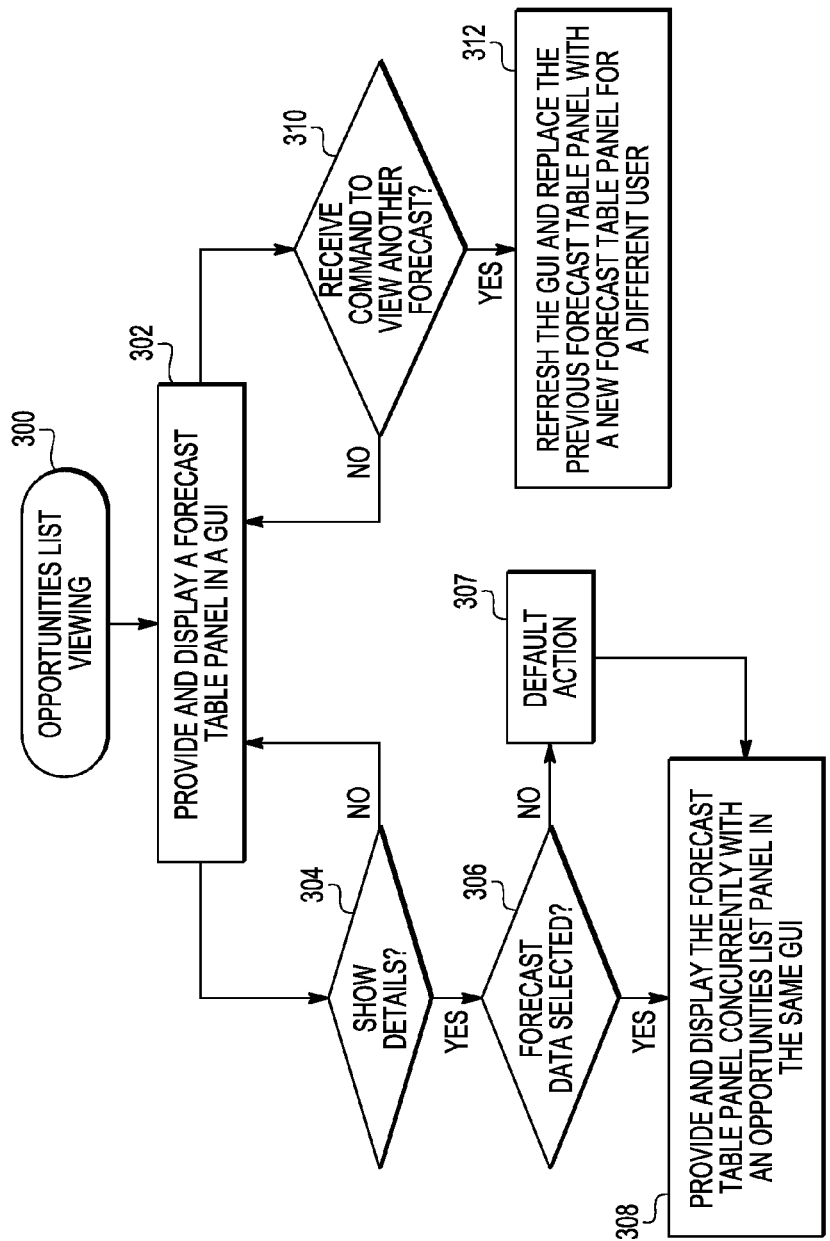
FIG. 3 is a flow chart that illustrates an exemplary embodiment of a process for presenting an opportunities list corresponding to forecast data in a GUI.

FIG. 2 is a flow chart that illustrates an exemplary embodiment of a process 200 for providing and displaying adjusted forecast data in a GUI, and FIG. 3 is a flow chart that illustrates an exemplary embodiment of a process 300 for providing and displaying an opportunities list in a GUI. The various tasks performed in connection with a described process may be performed by software, hardware, firmware, or any combination thereof. For illustrative purposes, the following description of the processes 200, 300 may refer to elements mentioned above in connection with FIG. 1. In practice, portions of a described process may be performed by different elements of the described system, e.g., a processor, an application platform, a virtual application, a client device, or any functional or operating module thereof. It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the described process as long as the intended overall functionality remains intact.

The following description of the processes 200, 300 will also refer to FIGS. 4-12, which depict a number of exemplary GUIs that may be displayed in connection with the use of a sales forecasting application. In practice, the GUIs can be rendered on a display element of a computer device, e.g., a desktop computer monitor, the display of a handheld electronic device, the display of a tablet computing device, the display of a mobile telephone, or the like. Although not always required, the GUIs may be realized as web pages, and certain graphical features of the GUIs may be provided, generated, or otherwise implemented using scripts, plug-in components, or other elements that cooperate with web pages.

Although not always required, the exemplary embodiments described here relate to the processing, presentation, and displaying of sales forecast data. In this regard, a forecasting feature that supports the described functionality may be provided with a CRM application, service, or system. It should be appreciated that the features and technologies presented here could also be leveraged in the context of other applications that process, present, and display other types of data.

FIG. 4 depicts an exemplary GUI 400 as it might be presented on a user's display element. For this particular embodiment, the GUI 400 is provided in the context of a sales forecasting feature of a CRM application. FIG. 4 depicts the state of the GUI 400 rendered with a forecast table panel 402. The forecast table panel 402 contains or otherwise indicates forecast data for at least one forecaster or user of the system. For this non-limiting example, the forecast table panel 402 contains forecast data for a person named Gordon Johnson. This embodiment of the forecast table panel 402 provides the forecast data as monetary amounts organized in columns under five headings: Quota; Closed; Commit; Best Case; and Pipeline. Amounts in the Quota column represent sales targets, and these amounts will usually be "static" and not easily modifiable after entry. Values in the remaining four columns correspond to forecasted amounts categorized according to certain milestones in the life or flow of a typical sales deal. In this regard, a sales deal usually progresses in the following order: Pipeline→Best Case→Commit→Closed and, therefore, the exemplary embodiment includes corresponding category names. It should be appreciated that an embodiment of a forecast table panel may include any number of headings and categories, and that the specific headings shown in FIG. 4 are merely exemplary. In this regard, it may be possible to add or remove categories in certain embodiments. Moreover, the names of the forecast categories need not be fixed, and an embodiment may accommodate user-configurable category names.

The forecast table panel 402 arranges the forecast data in a number of rows, including, without limitation: a total row and one or more month rows. In this particular embodiment, each month row can be displayed in a rolled-up state or in an expanded state. In FIG. 4, the November 2010 month row 404 is rendered in its expanded state, while the December 2010 month row 406 and other month rows are rendered in their rolled-up states. Expanding a month row results in the display of one or more individual forecasts that contribute to the total forecast amounts for that particular month. For example, the November 2010 month row 404 is associated with individual forecasts for five different forecasters, each having a respective row rendered under the November 2010 month row 404. In the context of this exemplary embodiment, each of the forecasters listed under the November 2010 month row 404 is a subordinate of the current user of the GUI, namely, Gordon Johnson. The illustrated embodiment of the forecast table panel 402 also includes at least one total row 407. For this example, the total row 407 includes grand total amounts for a particular time period (November 2010 to April 2011). Alternatively or additionally, a total row could be used to show annual totals, quarterly totals, or the like. In an alternate embodiment, rows of the forecast data could be arranged using a different scheme, using different labels or designations, or the like.

The organization of data and the relationship between different data types may vary from that described here for the exemplary embodiment. For example, although the embodiment described here organizes subordinates within rows of months, it may instead be desirable to organize months within rows of subordinate names. As another example, it may be desirable to organize subordinates according to product family. Indeed, one data type or group may be gathered and organized according to any other data type or group, as desired.

A specific amount contained in the forecast table panel 402 is located in a forecast cell. In the illustrated embodiment, a forecast cell corresponds to the intersection of a column and a row of the forecast table panel 402. For example, a forecast cell 408 contains the quota amount for the month of February 2011, and another forecast cell 410 contains Jimmy Kim's forecast for the Commit category in the month of November 2010.

Figure 6:
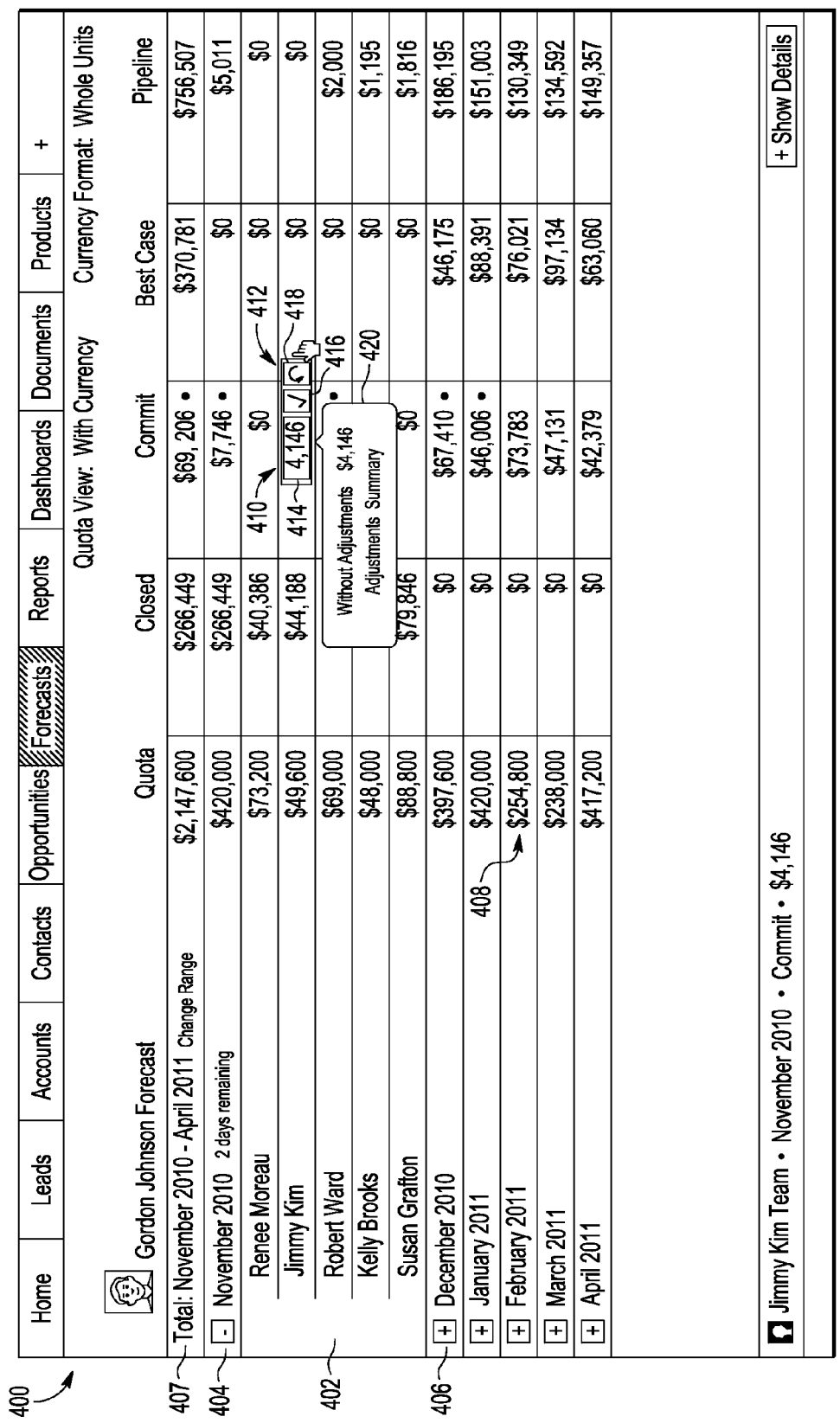

Referring now to FIG. 2, the process 200 represents one embodiment of a computer-implemented method of presenting information associated with an application, such as a virtual CRM application. More particularly, the process 200 represents one embodiment of a method of displaying adjustments to forecasted data in a GUI associated with an interactive sales forecasting application, which may be realized as a virtual CRM application. The process 200 provides and displays forecast data in a GUI, preferably using forecast cells that graphically indicate the forecast data (task 202). In certain embodiments, a forecast cell may be provided with a GUI control element to enable user adjustment of the sales forecast data contained in that forecast cell. Referring to FIG. 5, the forecast cell 410 is provided and rendered in conjunction with a GUI control element 412 that allows the user to adjust the amount in the forecast cell 410. As illustrated in FIG. 5, the GUI control element 412 may be activated to enter an adjustment or an adjusted amount. FIG. 6 depicts the forecast cell 410 and the GUI control element 412 after activation of the GUI control element 412. Activation of the GUI control element 412 launches a data entry box 414 in which the user can enter an adjusted forecast amount. This particular embodiment of the GUI control element 412 also includes a "check" or "OK" button 416 that, when activated, saves the amount entered in the data entry box 414. The GUI control element 412 may also include a "cancel" button 418 that, when activated, cancels the adjustment action currently being performed. When the GUI control element 412 is active (as shown in FIG. 6), the GUI 400 may be rendered with a hover box 420, a popup message, or other indication of the original forecast amount, i.e., the "Without Adjustments" amount. For this example, the Without Adjustments amount for the forecast cell 410 is $4,146. Moreover, this example assumes that an adjusted forecast value of $5000 is entered by the current user (Gordon Johnson) using the GUI control element 412 (see FIG. 7).

Referring back to FIG. 2, the process 200 determines or detects whether or not the user's cursor is hovering over a forecast cell, or is otherwise positioned within close proximity to a forecast cell (query task 204). Alternatively or additionally, the process 200 may detect any designated or defined user interaction with the forecast cell. If the process 200 detects a cursor hovering status associated with a displayed forecast cell, then the process checks whether or not that forecast cell includes an adjusted forecast value (query task 206). If cursor hovering status is not detected, then the process 200 may exit or be reentered at an appropriate point, such as task 202.

If query task 206 determines that the forecast cell does not contain an adjusted forecast value, then the process 200 may exit or be reentered at an appropriate point, such as task 202. If, however, the forecast cell includes an adjusted forecast amount, then the process 200 generates, provides, and displays a suitably formatted hover box in the GUI (task 208). In this regard, the hover box is rendered in response to detecting the hovering status and in response to the presence of adjusted forecast data in the forecast cell. Notably, the hover box graphically indicates adjustment status information associated with the forecast data and/or associated with the forecast cell. In practice, the content of the hover box may depend upon various factors, such as the amount of the adjustment, the source of the adjusted amount(s), and the like.

FIG. 7 depicts the state of the GUI 400 after the forecast cell 410 has been populated with the adjusted forecast value of $5000. Moreover, FIG. 7 depicts the GUI 400 when the user's cursor 424 is hovering over (or near) the forecast cell 410. Under these conditions, a hover box 426 is automatically generated and rendered with the GUI 400. For this particular embodiment and example, the hover box 426 is generated and displayed such that it graphically indicates the adjusted forecast value of $5000. More specifically, the hover box 426 graphically indicates the user-adjusted value of forecast data, i.e., the forecast amount as adjusted by the current user of the GUI (Gordon Johnson for this example). Accordingly, the illustrated embodiment of the hover box 426 displays the label "Me" with the user-adjusted forecast value of $5000. In practice, the hover box 426 could be generated and displayed such that it graphically indicates one or more additional forecast values, if needed or desired. Moreover, the hover box 426 could be generated and displayed such that it graphically indicates the non-adjusted or initial value of the forecast data associated with the forecast cell 410. In this regard, the illustrated embodiment of the hover box 426 displays the label "Without Adjustments" in conjunction with the original forecast value of $4,146.

In certain implementations, the hover box 426 is generated with read-only characteristics, where the information conveyed in the hover box 426 is static and not directly modifiable. In alternate embodiments, however, the hover box 426 could be generated as an active control that enables the user to make further adjustments to the forecasted amount if so desired. As shown in FIG. 7, the hover box 426 displays the initial monetary amount of the pre-adjustment forecast value, along with the adjusted monetary amount of the adjusted forecast value, where the adjusted monetary amount is somehow based on the initial monetary amount. For example, the adjusted monetary amount might be equal to the initial monetary amount plus or minus some other amount. As another example, the adjusted monetary amount might be equal to the initial monetary amount subjected to an adjustment formula or algorithm.

Figure 8:
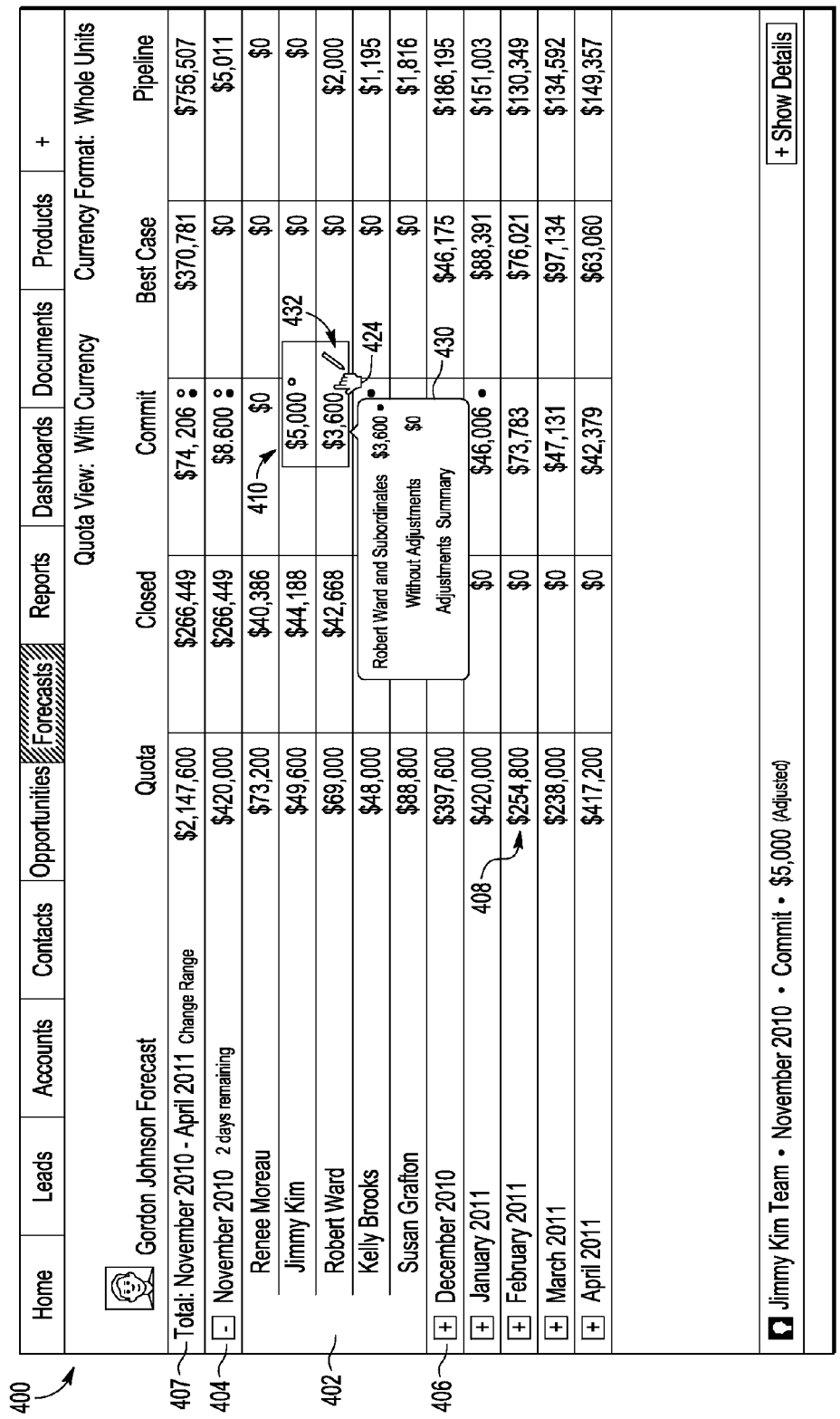

Generation and display of the hover box is dynamic in nature in that the hover box automatically appears when the cursor 424 is moved over (or near) a forecast cell that contains adjusted forecast data, and automatically disappears when the cursor 424 is moved away from a forecast cell that contains adjusted forecast data. Thus, respective hover boxes may dynamically appear and disappear as the cursor 424 traverses the forecast cells of the forecast table panel 402. The transition from that depicted in FIG. 7 to that depicted in FIG. 8 illustrates the dynamic nature of the hover box. In FIG. 7, the hover box 426 is displayed because the cursor 424 is positioned over the forecast cell 410 (which contains adjusted forecast data). In FIG. 8, however, the hover box 426 is no longer displayed. Instead, a different hover box 430 is displayed because the cursor 424 is positioned over a different forecast cell 432 (which contains an adjusted forecast value of $3,600).

Although not always required, the exemplary embodiment presented here provides and renders at most three forecast values per hover box, with respective identifying labels: (1) a value for "Me"; (2) a value for "My Subordinates" or a value for "<NAME> and Subordinates"; and (3) a value for "Without Adjustments". The value for "Me" represents an adjusted forecast value that includes an adjustment entered by the current user (Gordon Johnson for this example) and any other adjustments that may have been entered by others (e.g., Gordon Johnson's subordinates). The value for "My Subordinates" is provided when the forecast cell appears in a month row or a total row of the forecast table panel 402, and the value of "<NAME> and Subordinates" is provided when the forecast cell appears in a row corresponding to the name of a subordinate (the actual name of this subordinate will appear in lieu of <NAME>). In either case, the value of "My Subordinates" or "<NAME> and Subordinates" represents all adjustments that may have been entered, excluding adjustments made by the current user. The value for "Without Adjustments" represents the non-adjusted, initial, or original forecast value corresponding to the forecast cell. Using this exemplary scheme, therefore, a given hover box could be generated such that in graphically indicates a user-adjusted value of forecast data (e.g., a Me value), a non-user-adjusted value of forecast data (e.g., a My Subordinates value or a <NAME> and Subordinates value, where only one subordinate has entered an adjustment), and/or a collective non-user-adjusted value of forecast data (e.g., a My Subordinates value or a <NAME> and Subordinates value, where multiple subordinates have entered a plurality of adjustments to initial forecast data).

The hover box 420 depicted in FIG. 6 represents a special case where the GUI control element 412 has been activated, but no adjustments have been entered yet. Accordingly, the hover box 420 only contains the Without Adjustments value of $4,146. The hover box 426 depicted in FIG. 7 corresponds to the scenario where only the current user has made an adjustment. Accordingly, the hover box 426 includes the Me value of $5,000 along with the Without Adjustments value of $4,146. The hover box 430 depicted in FIG. 8 corresponds to the scenario where the current user has not entered an adjustment, but at least one subordinate of the current user has made an adjustment. Accordingly, the hover box 430 displays a value of $3,600 for Robert Ward and Subordinates, along with the Without Adjustments value of $0. The hover box 434 shown in FIG. 9 corresponds to the situation where the current user and at least one subordinate of the current user have made adjustments. Thus, the hover box 434 includes a Me value of $4,000, a value of $3,600 for Robert Ward and Subordinates, and a Without Adjustments value of $3,081. Notably, the information displayed in a hover box allows the viewer to quickly and efficiently gain an understanding of the adjustment status of forecast amounts provided on the forecast table panel 402.

It should be appreciated that adjustments need not be additive, and that a given adjusted forecast value may reflect increases and/or decreases in a forecasted amount by any number of users. For example, Gordon Johnson might view a forecast value that has been subjected to cumulative increases, cumulative decreases, or increases and decreases by multiple subordinates. In this regard, some of Gordon Johnson's subordinates may have increased a forecast amount, while others may have decreased the same forecast amount.

With continued reference to FIG. 9, the GUI 400 and/or the forecast adjustment hover boxes may be provided, generated, and displayed in a manner that graphically indicates at least one source of adjustments associated with adjusted forecast values. In certain embodiments, the adjustment status information rendered with the hover boxes includes one or more graphical icons that signify whether the current user is a source of a forecast adjustment and whether a subordinate of the current user is a source of a forecast adjustment. More specifically, a first graphically distinguishable icon or element is displayed when the source of a forecast adjustment includes the current user of the GUI 400, and a second graphically distinguishable icon or element is displayed when the source of a forecast adjustment includes a subordinate of the current user of the GUI 400.

Referring again to FIG. 9, the hover box 434 includes a first icon 436 (an open circle in this example) to serve as an indication that the current user has made an adjustment to the forecast value. In other words, the Me value of $4,000 represents an adjusted forecast value that includes an adjustment entered by the current user. The hover box 434 also includes a second icon 438 (a closed circle in this example) to serve as an indication that someone other than the current user has made an adjustment to the forecast value. Thus, the value of $3,600 for Robert Ward and Subordinates is rendered with the second icon 438. In addition to, or in lieu of, source-identifying icons rendered in a hover box, the GUI 400 may render such icons in or near forecast cells that contain adjusted forecast data. In this regard, the forecast cell 440 associated with the hover box 434 is rendered with both icon types. This allows the user of the GUI 400 to quickly determine (even without the hover box 434 displayed) that the value in the forecast cell 440 represents an amount that has been subjected to adjustments entered by the current user and at least one subordinate of the current user. As another example, the forecast cell 442 includes an open circle icon by itself, which indicates that the value in the forecast cell 442 represents an amount that has been adjusted by the current user. In contrast, the forecast cell 444 includes a closed circle icon by itself, which indicates that the value in the forecast cell 444 represents an amount that has not been adjusted by the current user, but has been adjusted by at least one subordinate of the current user. Accordingly, forecast cells rendered without any adjustment source identifying icons contain non-adjusted forecast data.

Referring again to FIG. 3, the process 300 represents one embodiment of a computer-implemented method of presenting information associated with an application, such as a virtual CRM application. More particularly, the process 300 represents one embodiment of a method of formatting forecasted data for display in a GUI associated with an interactive sales forecasting application, which may be realized as a virtual CRM application. The process 300 provides, generates, and displays a forecast table panel in a GUI, preferably using forecast cells that graphically indicate the forecast data (task 302). The example described here assumes that the forecast table panel is initially rendered and displayed in a "full screen" mode. In this regard, the forecast table panel 402 shown in FIG. 4 is displayed by itself and occupying most of the available area of the GUI 400.

Referring again to FIG. 3, the process 300 checks for a command or instruction to show additional details (query task 304). For example, if the process 300 receives an appropriate activation command or instruction, then the process 300 continues by generating and providing additional details (e.g., in the form of an opportunities list panel) in a second area of the GUI. The content and format of the opportunities list panel is influenced by the selection or highlighting of forecast data in the forecast table panel. Accordingly, if the process 300 receives an instruction or request corresponding to a selection of at least some of the forecast data contained in the forecast table panel (query task 306), then the process 300 responds to the instruction or request by generating, providing, and displaying an opportunities list panel in a second area of the GUI, accompanying the forecast table panel (task 308). If no forecast data is actively selected, then the process performs a default action. For example, the default state for the forecast table panel may correspond to the selection of the current month. Alternatively, the process 300 may proceed as though nothing has been selected for purposes of displaying in the opportunities list panel.

For the exemplary embodiment described here, the GUI 400 can be manipulated by the user to display additional details associated with the forecast data contained in the forecast table panel 402 (see FIG. 4). In this regard, the GUI 400 may be provided with an appropriate user interface control 450 that, when selected, activates the opportunities list panel in the GUI. FIG. 10 depicts the state of the GUI 400 after activation of an opportunities list panel 452. Notably, the forecast table panel 402 and the opportunities list panel 452 are provided and displayed concurrently in the GUI 400, each occupying a respective area of the GUI 400. For the illustrated embodiment, the forecast table panel 402 occupies an upper area of the GUI 400, and the opportunities list panel occupies a lower area of the GUI 400. Although not always required, the forecast table panel 402 and the opportunities list panel 452 may be concurrently displayed in a split screen format. In practice, one or both of these panels may be resized by selecting and dragging a divider 454 up or down as desired. Moreover, scrollbars 456 can be provided to accommodate scrolling of the forecast table panel 402 and/or the opportunities list panel 452 (as needed).

In certain implementations, the content of the opportunities list panel is influenced or determined by the forecast data that is selected in the forecast table panel. For example, the opportunities list panel may include breakdown details of the selected forecast data, where such breakdown details are normally unavailable in the forecast data panel. As mentioned previously, the forecast data panel typically includes monetary forecast values arranged by month, forecaster name, deal flow category, etc. In contrast, an entry in the opportunities list panel may include additional data that is not displayed in the forecast data panel. Such additional data may include, without limitation, one or more of the following items for each opportunity or entry: a name of the opportunity; an account name for the opportunity; a monetary amount associated with the opportunity; one or more dates associated with the opportunity, such as a close date or an estimated close date; a stage or status of the opportunity; a probability associated with the opportunity; a category for the opportunity; the name of the owner or salesperson responsible for the opportunity; the name of a sales manager; a department or business unit for the opportunity; or the like. In certain embodiments, these fields could be user-configurable, user-selectable, or otherwise customizable. Moreover, one or more of these fields can be provided as sortable columns, and sorting of the opportunities could be associated with one field, any combination of fields, or any defined pattern of fields as desired.

Referring again to FIG. 10, the forecast table panel 402 may contain at least some forecast data arranged by month, for example, the November 2010 month row 404. This example assumes that the November 2010 month row 404 has been selected and, therefore, that a command or instruction has been received to identify the selected month (November 2010) and to access detailed forecast data in accordance with the selected month. This enables the opportunities list panel 452 to be populated and rendered with the accessed detailed forecast data, e.g., a listing of individual opportunities and related status information for the selected month. As a result of the selection of the entire November 2010 month row 404, the opportunities list panel 452 includes a listing of all the opportunities having a close date (or an estimated close date) in November 2010, in all categories. If a selection in the forecast table panel results in no opportunities, then the opportunities list panel 452 can be displayed in an empty state with no opportunity entries. Moreover, the opportunities list panel 452 may be displayed with a summary heading 457 that indicates the display or filtering criteria applied to the content of the opportunities list panel 452. The summary heading 457 may also include a total forecast amount corresponding to the selected forecast data. The opportunities list panel 452 may also include an appropriate user interface control 458 that, when activated, closes or hides the opportunities list panel 452.

FIG. 11 depicts the state of the GUI 400 after the selection of an individual forecast cell 460 in the forecast table panel 402. For this example, the selected forecast cell 460 corresponds to Jimmy Kim's "Commit" category forecast for the month of November 2010. Notably, the entire row for Jimmy Kim is not selected here; only the forecast cell 460 is selected. Consequently, the content of the opportunities list panel 452 is updated to reflect constituent opportunities associated with the selected forecast cell 460. In this regard, the content of the opportunities list panel 452 depicted in FIG. 11 includes a listing of individual opportunities and related status information for a selected month (November 2010), a selected forecaster (Jimmy Kim), and a selected category (Commit).

It should be appreciated that the opportunities list panel 452 could also be rendered to reflect the selection of an entire row for one forecaster name. For that scenario, the content of the opportunities list panel 452 would include a listing of individual opportunities and related status information for a selected month (e.g., November 2010) and a selected forecaster (e.g., Jimmy Kim). It may also be possible to generate and render the opportunities list panel 452 such that it includes a listing of all opportunities and related status information for a selected forecaster (e.g., Jimmy Kim), regardless of the close date or estimated close date. Indeed, the information accessed and displayed with the opportunities list panel 452 may be influenced by any practical combination of searchable or filterable parameters associated with the forecast data presented in the forecast table panel 402.

Although the forecast table panel 402 and the opportunities list panel 452 are both depicted in a two-dimensional format, alternate embodiments may support three-dimensional renderings that facilitate the concurrent display of additional information. In this regard, the forecast table panel 402 and/or the opportunities list panel 452 could be rendered in a "pivoting" or "rotating" manner that allows the user to view additional dimensions as desired.

Referring back to FIG. 3, task 302 is associated with the display of a forecast table panel for a specified user or forecaster, such as Gordon Johnson. In certain situations, the current user may want to access or view a subordinate's forecast. To this end, the exemplary embodiment of the process 300 facilitates a quick transition from one forecast table panel to another, using a suitably configured and formatted user interface control (e.g., a selectable button, a hyperlink, or the like) in the GUI. User activation or selection of this user interface control may be associated with a command or a request to view another forecast table. Thus, if the process 300 receives a command to view another forecast table (query task 310), it generates, provides, and displays forecast data for another user. In certain embodiments, the process 300 refreshes the GUI such that the previously displayed forecast table panel is replaced with a different forecast table panel that contains forecast data for a different user (task 312). In alternate embodiments, the new forecast table panel could be rendered with some or all of the current forecast table panel.

FIG. 11 and FIG. 12 illustrate how this aspect of the process 300 is implemented in one exemplary embodiment. Referring to FIG. 11, the forecast table panel 402 contains a user interface control 464 that is associated with a user other than the current user (Gordon Johnson), associated with a forecast other than the one currently displayed, or the like. In certain embodiments, the user interface control 464 is realized as an active link that facilitates and enables viewing of forecast data for a different forecaster (e.g., Jimmy Kim). Accordingly, the user interface control 464 is preferably rendered near the other user's name. Although not shown in FIG. 11, other user interface controls may be displayed next to the names of other forecasters, to accommodate the display of forecast reports for those other forecasters. FIG. 11 illustrates the cursor 424 selecting and activating the user interface control 464 for purposes of launching Jimmy Kim's forecast.

FIG. 12 depicts the state of the GUI 400 after it has been refreshed to display Jimmy Kim's forecast. Notably, the previously displayed forecast table panel 402 has been replaced with a forecast table panel 466 that contains data corresponding to Jimmy Kim's forecast. For this example, Jimmy Kim is not the current user of the GUI 400—Gordon Johnson remains the current user of the GUI 400, and Gordon Johnson is merely viewing the forecast report of Jimmy Kim. The forecast table panel 466 for Jimmy Kim may have some or all of the general features and characteristics described above for the forecast table panel 402 for Gordon Johnson. Moreover, the forecast table panel 466 includes a user interface control 468 that, when activated, initiates the generation and display of the forecast report for Sally Williamson. Furthermore, the GUI 400 depicted in FIG. 12 includes an opportunities list panel 470 that includes a listing of opportunities and related information for the month of December 2010 in Jimmy Kim's forecast report.

The user interface features and functionality described above facilitate easier viewing and navigation of forecast reports, forecast data contained therein, and adjusted forecast data. These features allow a user of the GUI to quickly and efficiently access, view, and adjust forecast data in an intuitive and user-friendly manner.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method of presenting sales information associated with a virtual application, the method comprising the steps of:
    providing a forecast cell in a graphical user interface (GUI) of a computer, the forecast cell graphically indicating sales forecast data;
    detecting, via a processor of the computer, a cursor hovering status associated with the forecast cell; and
    in response to detecting the cursor hovering status, generating, via the processor of the computer, a hover box in the GUI, the hover box graphically indicating adjustment status information associated with the sales forecast data.

2. The method of claim 1, wherein the providing step comprises:
    providing the forecast cell in conjunction with a user interface control element that allows a user to adjust the sales forecast data.

3. The method of claim 1, wherein the generating step comprises:
    generating the hover box such that it graphically indicates at least one adjusted forecast value.

4. The method of claim 3, wherein the generating step comprises:
    generating the hover box such that it graphically indicates a user-adjusted value of sales forecast data.

5. The method of claim 3, wherein the generating step comprises:
    generating the hover box such that it graphically indicates a non-user-adjusted value of sales forecast data.

6. The method of claim 5, wherein the generating step comprises:
    generating the hover box such that it graphically indicates a collective non-user-adjusted value of sales forecast data, the collective non-user-adjusted value of sales forecast data reflecting a plurality of adjustments to initial sales forecast data made by non-users of the GUI.

7. The method of claim 3, wherein the generating step comprises:

generating the hover box such that it graphically indicates a non-adjusted value of sales forecast data.

8. The method of claim 1, wherein the generating step comprises:
generating the hover box with read-only characteristics.

9. A method of displaying adjustments to forecasted data in a graphical user interface (GUI) of a computer that is configured to execute an interactive sales forecasting application, the method comprising the steps of:
displaying a forecast cell in the GUI of the computer, the forecast cell including an adjusted sales forecast value that is an adjusted monetary amount;
detecting, via a processor of the computer, user interaction with the forecast cell; and
in response to detecting the user interaction with the forecast cell, displaying, in the GUI of the computer, adjustment status information for the forecast cell.

10. The method of claim 9, wherein the detecting step comprises:
detecting a hovering status of a cursor that is associated with the forecast cell.

11. The method of claim 9, wherein:
the adjusted sales forecast value is based on an initial monetary amount; and
the adjustment status information includes the initial monetary amount.

12. The method of claim 9, wherein:
the adjusted sales forecast value is based on an initial monetary amount; and
the adjustment status information includes the initial monetary amount and a user-adjusted monetary amount that reflects adjustments made by a user of the GUI.

13. The method of claim 9, wherein:
the adjusted sales forecast value is based on an initial monetary amount; and
the adjustment status information includes the initial monetary amount and a non-user-adjusted monetary amount that reflects adjustments made by a non-user of the GUI.

14. The method of claim 9, wherein:
the adjusted sales forecast value is based on an initial monetary amount; and
the adjustment status information includes the initial monetary amount, a user-adjusted monetary amount that reflects adjustments made by a user of the GUI, and a non-user-adjusted monetary amount that reflects adjustments made by a non-user of the GUI.

15. The method of claim 9, wherein the adjustment status information indicates at least one source of adjustments associated with the adjusted sales forecast value.

16. The method of claim 15, wherein:
the displaying step displays a first graphical icon when the at least one source of adjustments includes a user of the GUI; and
the displaying step displays a second graphical icon when the at least one source of adjustments includes a subordinate of the user of the GUI.

17. A computer system comprising a processor and a memory, wherein the memory comprises computer-executable instructions that, when executed by the processor, cause the computer system to:
provide a graphical user interface (GUI) control element to enable user adjustment of sales forecast data; and
provide a hover box associated with the GUI control element, the hover box graphically indicating adjustment status information for the sales forecast data.

18. The computer system of claim 17, wherein the computer-executable instructions cause the computer system to provide the hover box with adjustment status information that graphically indicates an initial non-adjusted value of sales forecast data.

19. The computer system of claim 17, wherein the computer-executable instructions cause the computer system to provide the hover box with adjustment status information that graphically indicates a user-adjusted value of sales forecast data.

20. The computer system of claim 17, wherein the computer-executable instructions cause the computer system to provide the hover box with adjustment status information that graphically indicates a non-user-adjusted value of sales forecast data.

21. A computer-implemented method of presenting information associated with a virtual application, the method comprising the steps of:
providing a forecast table panel in a first area of a graphical user interface (GUI) of a computer, the forecast table panel containing sales forecast data;
receiving, at a processor of the computer, an instruction corresponding to a selection of at least some of the sales forecast data, the instruction indicating selected sales forecast data; and
in response to receiving the instruction, providing an opportunities list panel in a second area of the GUI that is different than the first area, wherein content of the opportunities list panel is determined based on the selected sales forecast data.

22. The method of claim 21, wherein:
the forecast table panel contains sales forecast data for a first user; and
the method further comprises the step of:
providing a user interface control in the GUI, wherein the user interface control enables viewing of sales forecast data for a second user.

23. The method of claim 22, further comprising the steps of:
receiving a command corresponding to an activation of the user interface control; and
in response to receiving the command, providing the sales forecast data for the second user.

24. The method of claim 23, further comprising the step of refreshing the GUI such that the forecast table panel is replaced with a second forecast table panel that contains the sales forecast data for the second user.

25. The method of claim 21, wherein:
the forecast table panel contains sales forecast data arranged by month;
the instruction indicates a selected month; and
the content of the opportunities list panel comprises a listing of individual opportunities and related status for the selected month.

26. The method of claim 21, wherein:
the forecast table panel contains sales forecast data arranged by month and category;
the instruction indicates a selected month and a selected category; and
the content of the opportunities list panel comprises a listing of individual opportunities and related status for the selected month and the selected category.

27. The method of claim 21, wherein:
the forecast table panel contains sales forecast data arranged by forecaster name;
the instruction indicates a selected forecaster name; and
the content of the opportunities list panel comprises a listing of individual opportunities and related status for the selected forecaster name.

28. The method of claim 21, wherein:
the forecast table panel contains sales forecast data arranged by forecaster name and category;
the instruction indicates a selected forecaster name and a selected category; and
the content of the opportunities list panel comprises a listing of individual opportunities and related status for the selected forecaster name and the selected category.

29. A method of formatting forecasted data for display in a graphical user interface (GUI) of a computer that is configured to execute an interactive sales forecasting application, the method comprising the steps of:
generating, via a processor of the computer, a forecast table panel in a first area of the GUI, the forecast table panel containing sales forecast data; and
generating, via the processor of the computer, an opportunities list panel in a second area of the GUI that is different than the first area, wherein content of the opportunities list panel is influenced by selected sales forecast data included in the forecast table panel, and the content of the opportunities list panel comprises a listing of individual opportunities and related status for the selected sales forecast data.

30. The method of claim 29, further comprising the step of: concurrently displaying the forecast table panel and the opportunities list panel in a split screen format.

31. The method of claim 29, further comprising the step of:
receiving a command corresponding to an activation of the opportunities list panel, wherein the opportunities list panel is generated in response to receiving the command.

32. The method of claim 29, further comprising the step of:
receiving an instruction corresponding to a selection, in the forecast table panel, of the selected sales forecast data, wherein the opportunities list panel is generated in response to receiving the instruction.

33. The method of claim 32, wherein:
the forecast table panel contains sales forecast data arranged by month;
the instruction indicates a selected month;
the method further comprises the step of:
accessing detailed sales forecast data in accordance with the selected month; and
wherein the content of the opportunities list panel comprises the detailed sales forecast data.

34. The method of claim 32, wherein:
the forecast table panel contains sales forecast data arranged by category;
the instruction indicates a selected category;
the method further comprises the step of:
accessing detailed sales forecast data in accordance with the selected category; and
wherein the content of the opportunities list panel comprises the detailed sales forecast data.

35. The method of claim 32, wherein:
the forecast table panel contains sales forecast data arranged by forecaster name;
the instruction indicates a selected forecaster name;
the method further comprises the step of:
accessing detailed sales forecast data in accordance with the selected forecaster name; and
wherein the content of the opportunities list panel comprises the detailed sales forecast data.

36. A computer system comprising a processor and a memory, wherein the memory comprises computer-executable instructions that, when executed by the processor, cause the computer system to:
provide a forecast table panel in a first area of a graphical user interface (GUI), the forecast table panel containing sales forecast data;
receive a request corresponding to selected sales forecast data included in the forecast table panel; and
in response to the request, generate an opportunities list panel in a second area of the GUI that is different than the first area, wherein the opportunities list panel includes a listing of individual opportunities and related status corresponding to the selected sales forecast data.

37. The computer system of claim 36, wherein:
the forecast table panel contains sales forecast data arranged by month;
the request corresponds to a selected month in the forecast table panel; and
the opportunities list panel includes a listing of individual opportunities and related status for the selected month.

38. The computer system of claim 36, wherein:
the forecast table panel contains sales forecast data arranged forecaster name;
the request corresponds to a selected forecaster name in the forecast table panel; and
the opportunities list panel includes a listing of individual opportunities and related status for the selected forecaster name.

* * * * *